United States Patent [19]

Hiroishi

[11] Patent Number: 4,536,856

[45] Date of Patent: Aug. 20, 1985

[54] METHOD OF AND APPARATUS FOR CONTROLLING THE DISPLAY OF VIDEO SIGNAL INFORMATION

[75] Inventor: Akihiko Hiroishi, Tokyo, Japan

[73] Assignee: Sord Computer Systems, Inc., Tokyo, Japan

[21] Appl. No.: 656,401

[22] Filed: Sep. 20, 1984

Related U.S. Application Data

[63] Continuation-in-part of Ser. No. 385,856, Jun. 7, 1982, abandoned.

[51] Int. Cl.[3] .................... G06F 3/14

[52] U.S. Cl. .................... 364/900

[58] Field of Search ... 364/200 MS File, 900 MS File, 364/710, 706

[56] References Cited

U.S. PATENT DOCUMENTS

| | | | |
|---|---|---|---|
| 4,070,710 | 1/1978 | Sukonick et al. | 364/900 |
| 4,110,823 | 8/1978 | Cronshaw et al. | 364/200 |
| 4,347,506 | 8/1982 | Duwel et al. | 364/900 |
| 4,365,290 | 12/1982 | Nelms et al. | 364/707 |
| 4,373,194 | 2/1983 | Demke et al. | 364/900 |
| 4,398,264 | 8/1983 | Couper et al. | 364/200 |
| 4,409,652 | 10/1983 | Neumann et al. | 364/200 |

*Primary Examiner*—Raulfe B. Zache
*Assistant Examiner*—David Y. Eng
*Attorney, Agent, or Firm*—Wenderoth, Lind & Ponack

[57] ABSTRACT

A video signal display control method and apparatus provide the display control functions for LCD-type or other similar display devices to be attached as output display units to an external microcomputer or other control systems that provide output video signals. The display controller contains computer program codes for processing the output video signals and permitting video signal information to be presented on a scaled-up size, on a scaled-down size, or as a partially extracted information on the physical screen of the display devices. The limitations on the performance of the external microcomputer imposed by the inherent performance of the display devices have thus been eliminated, allowing for the optimum use of the microcomputer performance.

8 Claims, 6 Drawing Figures

METHOD OF AND APPARATUS FOR CONTROLLING THE DISPLAY OF VIDEO SIGNAL INFORMATION

This application is a continuation-in-part of now abandoned application Ser. No. 385,856, filed June 7, 1982.

BACKGROUND OF THE INVENTION

1. Field of the Invention

The present invention relates generally to a display control in a computer system and more particularly to a method of and an apparatus for controlling the display of video signal information on the display devices of different types which are usually connected as output devices to an external micro computer or other control systems for use in a process control application or other applications. The display devices to which the present invention applied are display units that employ a liquid crystal display (LCD) element and other similar display elements. Those display devices may provide output video signal information in visible character, tabulated, or graphical form.

2. Description of the Prior Art

In the process control field, for example, various types of display devices are used as visual output devices for presenting on their screens the video signal information which is delivered from their attached microcomputer or other process control system. It is also known that the display devices are used in other computer applications so as to provide an easy and direct means of a man-to-machine communication or interface. The display devices currently available in the computer system configuration range widely from the television-type displays employing a CRT screen such as monitor TV and home-use TV receivers to other display units of the type that employs a liquid crystal display (LCD) element and other similar display elements. In most cases, those display devices provides a display of the output data of the main computer system in a character form or graphical representation in colors or monochrome. When a computer system is configured to include display units, the display devices are usually connected to the central processor (CPU) through appropriate channels and display controls. In this case, the display controls only provide the sequence control and buffering facilities. All the display devices mentioned above that are available for commercial use, however, have hardware and software limitations on their display capabilities. In other words, the number of characters, the kind of colors, and the contents of graphical representation such as shapes, graphs, etc. that the display devices are capable of presenting at a time on their screens are all limited. The conventional display controls are not designed to provide such control functions as to permit the display devices to display all output information at a time as required. The performance or capabilities of the computer system are restricted by the hardware and software limitations on the display devices, and therefore cannot be utilized completely or effectively.

When the operation of the computer system involves the operation of the display devices; therefore, the optimum use of the computer performance or functions is practically impossible, leaving the most part of its performance not utilized. When the computer system provides output video signals, the display device that can display the video signal information is limited to the type of display device which employ a CRT screen, such as monitor television receiver and home-use television receiver. If it is desired that the video signal information be displayed on the other types of display devices that employ an LCD element or other similar display element, appropriate hardware and software implementation must be built in the microcomputer package in order to handle or process the video signals to allow those display devices to display the visual information based on the processed video signals. However, a great amount of development efforts and costs must be required for this implementation.

SUMMARY OF THE INVENTION

In view of the problems and disadvantages of the prior art technology, the principal object of the present invention is therefore to provide a display controller which is a package of hardware and software designed to control the LCD (and other similar display elements) display. The display controller, which operates independently of the conventional display controls, incorporates the computer microprogrammed functions or instructions such as information transfer, arithmetic operation, logical operation, shifting, branching, and other subroutine for processing the output video signals of the external microcomputer system being used in particular computer applications. The internal computer functions or instructions of the display controller are microprogrammed and stored in memory. The execution of the instructions by the computer (CPU) section in the display controller causes the video signals to be processed so that the information represented by the video signals can be displayed on the particular display devices. In order to display the video signal information, specific display drivers are provided and are operated by the processed video signals so that the video signal information can be presented on the display device. Through the internal processing of the video signals within the display controller, it is thus possible to cause the display device to select and display any required portion of the video signal information from a virtual display space which is created by the output video signals of the external microcomputer. As a result, the present invention has solved the problems of the prior art by eliminating the above described limitations in the performance of the display devices and by thus making it possible to take full advantage of the performance of the external microcomputer. The present invention also provides for the possibility of further improving the microcomputer performance. It should particularly be noted that for the LCD or other similar displays being used, the present invention eliminates the need of developing the special hardware and software to be implemented in the external microcomputer to which those displays are to be attached. If the external microcomputer is designed to provide video signal output, the display controller according to the present invention enables even those display types employing LCD or the like elements to display video signal information on their screens by attaching through the display controller to the external microcomputer.

BRIEF DESCRIPTION OF THE DRAWINGS

Those and other objects and advantages of the present invention will become apparent from the following description that will be given in detail by referring to the preferred embodiments of the invention as illustrated in the accompanying drawings, in which.

DESCRIPTION OF THE PREFERRED EMBODIMENTS

Figure 1:
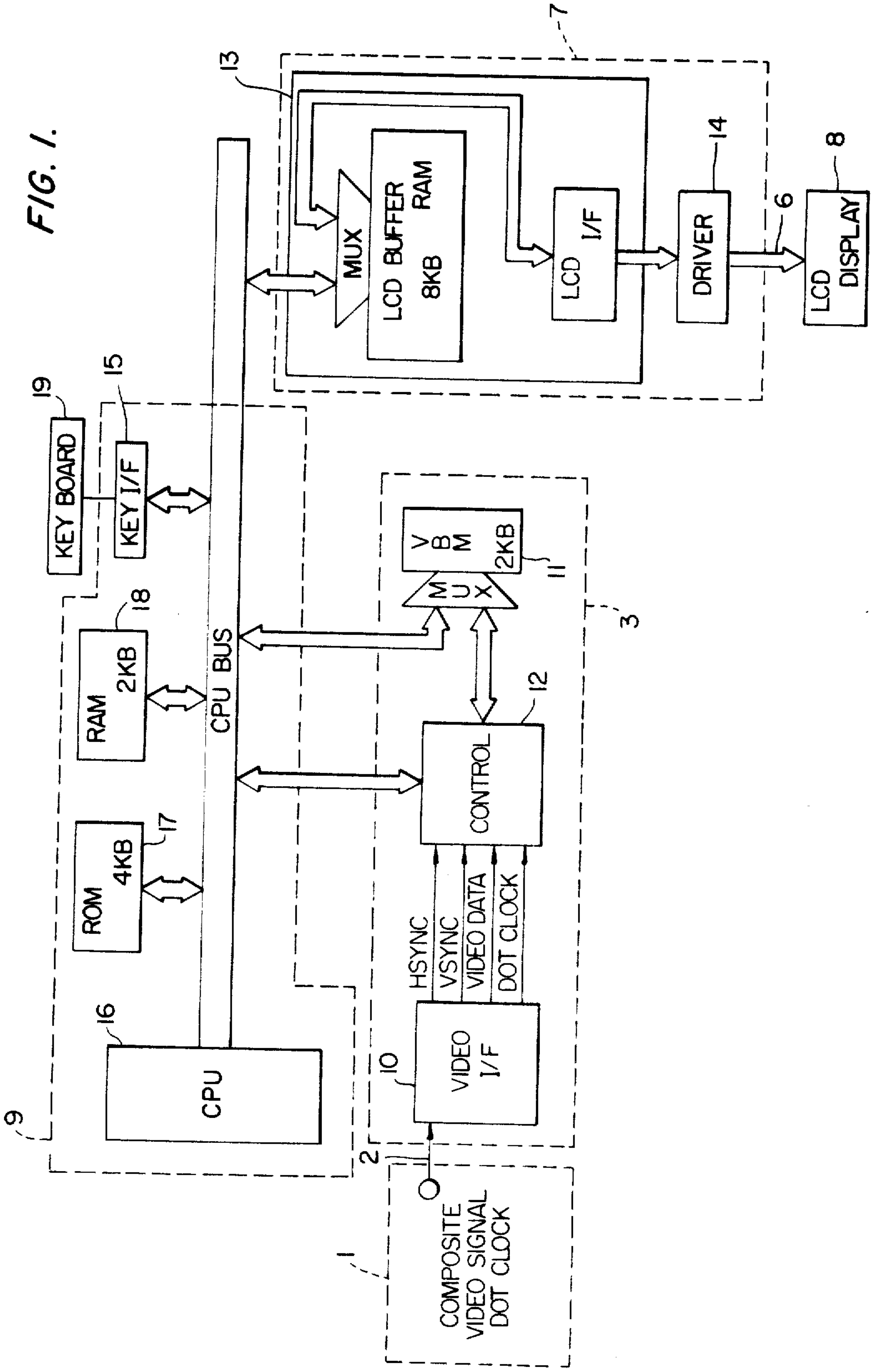
FIG. 1 in a block diagram showing the overall configuration of the system and the arrangement of the internal elements in the display controller package according to the present invention.

FIG. 1 shows a block diagram in which LCD display devices are attached through the display controller to an external microcomputer or other control system 1 which is used in a process control in this example. As described earlier, the display devices to which the present invention applies include displays that employ LCD (liquid crystal display) and the like elements. In one form of the preferred embodiment of the present invention as shown in FIG. 1, the display controller is packaged in one unit, and includes an input section 3 to which video signals 2 (composite signals or R.G.B. signals) are to be applied from the external microcomputer 1, an output section 7 which is also connected to the input section 3 and provides output signals 6*a* for enabling the LCD, etc. displays to be operated for the display, and a control section 9 which provides the microprogrammed control functions for the input section 3 and the output section 7. Each of the sections of the display controller is then illustrated specifically.

The input section 3 includes a video buffer memory 11 and a control circuit 12, as well as a video interface 10 through which the control circuit 12 is to be connected to the external microcomputer 1. The operation of the control circuit 12 is controlled by the control section 9 which is later to be described in detail. The output section 7 for the LCD, etc. displays includes an LCD buffer RAM 13 and a display driver 14. The LCD buffer RAM 13 provide 8KB of memory, and the data temporarily contained in this RAM is fed through the display driver 14 into the LCD, etc. displays 8. The control section 9 which provides the microcoded control functions for the control circuit 12 and LCD buffer RAM 13 and 13*a* comprises an interface 15 to a keyboard 19, a central processor (CPU) 16, a read-only memory (ROM) 17, and a random-access memory (RAM) 18, the CPU, ROM and RAM being connected in parallel to the interface 15. It is known per se that the CPU 16 executes the microprogrammed codes contained in ROM 17 and/or RAM 18, and performs the computer functions corresponding to the microprogrammed code sequences, such as information transfer, arithmetic operation, logical operation, shift operation, branch operation, and other subroutine calls. Those computer functions or instructions are specifically implemented to process the video signals supplied from the external microcomputer. However, as the present invention is not directed to the implementation of such softwate, its description is omitted. The concept of the invention is only illustrated.

Through the internal processing of the signals transferred from the control circuit 12 to the LCD buffer RAM 13, in accordance with the above internal computer functions, the control section 9 establishes relationships between the input signals 2 and output signals 6, such that actual information can be displayed on a scale of 1:1, on a scaled-up size, on a scaled-down size, or as partially extracted. Those scale relatinship and partial extraction between input and output signals can be given by the operation of the keyboard 19 which is connected to the interface 15 within the control section 9.

Figure 2:
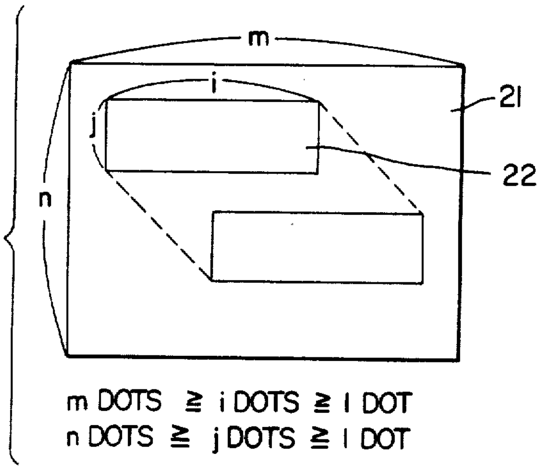
FIG. 2 is a display screen diagram according to the present invention, illustrating the relationship between the virtual display screen or space created by the video signals and the physical display screen on the display devices on which video signal information is to be displayed as scaled-up, scaled-down, or partially extracted in relation to the virtual display screen.

In the above described embodiment, the external microcomputer or other control system 1 provides a virtual display space created by video signals 2 which are stored in its internal video RAM (random-access memory), from which any required scale or portion of visual information can be displayed on the physical screen of the LCD and other similar displays 8. The display devices that employ an LCD element or other similar display elements include a plasma display, LED (light emitting diode) display, fluorescent display and the like. Generally, the screen capacity or the number of characters, etc. that those display types 8 can display at a time on the screen is smaller than that of other displays, thus limiting the amount of information displayable at a time. If the entire system is configured to include the particular display types 8 as output devices, it is an effective method to permit the display devices 8 to present any portion of information as required, by selectively extracting it from the virtual display space created by the video signals of the external microcomputer 1. FIG. 2 illustrates the relationship between the physical screen size and the virtual screen size. In FIG. 2, a virtual display screen is designated by reference numeral 21, which represents a virtual display space with a matrix of $m \times n$ dots created by the output video signals 2 of the external microcomputer 1. The physical screen 22 on the LCD, etc. displays 8 has a smaller size than the virtual display screen or space 21, as indicated by a matrix of $i \times j$ dots. The physical screen 22 may be fixed on a certain area of the virtual display screen 21, or may be scrollable within the range of the virtual display screen 21. If the display on the physical screen 22 is fixed, it is possible to display only the portion of information that is required at present on the fixed area of the screen 22, with additional portions of the information being displayed on the remaining areas of the screen 22 whenever they are required. If the physical screen 22 is capable of scrolling up or down and scrolling right or left, it is possible to display all required information at a time on the physical screen 22, as the physical screen 22 can contain the amount of information equal to the virtual display space. In either case, this can be accomplished without effecting the video signals 2 of the external microcomputer 1.

Figure 3:
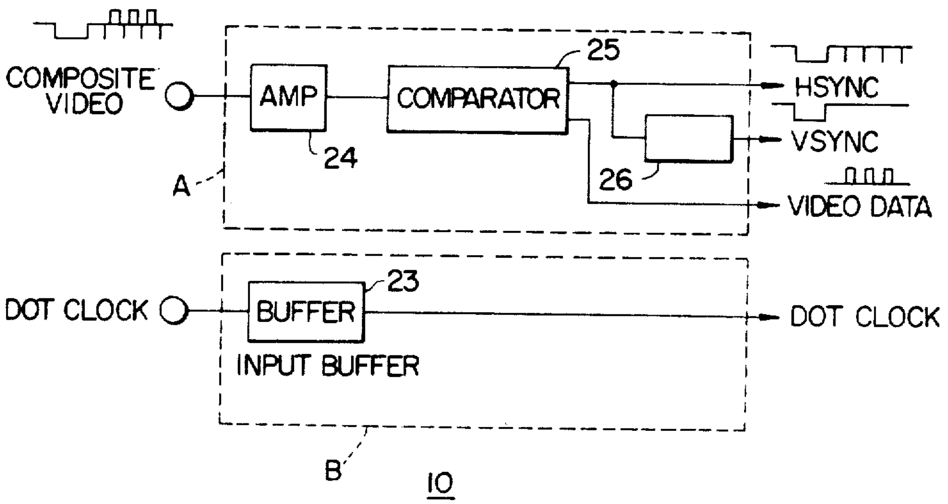
FIG. 3 is a block diagram for the internal structure of the video signal interface feature interposed between the external microcomputer and the control circuit.

The following provides a detailed description of the circuit arrangement including the principal circuit components specifically designed to provide display control functions featured by the present invention, and described how the operation of those individual circuit components can take place in accordance with the present invention. The video interface 10 within the input section 3 provides an inferfacing function between the external microcomputer 1 and the control circuit 12 within the input section 3. As particularly shown in FIG. 3, the video interface 10 is divided into two blocks A and B. The block A has an input terminal to which conposite video signal output of the external microcomputer 1 is to be applied, and the block B has an input terminal to which dot clock signal output of the external microcomputer 1 is to be applied. The block A processes the input composite video signals and transforms them to digital signals. To this end, the block A is arranged to contain an amplifier 24, a comparator 25, and an integrator 26. A composite video signal is fed into the amplifier 24, which provides an amplified signal output to the comparator 25. As shown, the comparator contains a reference threshold voltage value previously set, and separates the video signal into HSYNC signal and video data signal accordingly. HSYNC signal is then fed to the integrator 26, which integrates it to provide VSYNC signal. The block B includes an input buffer 23, which stores dot clock signals and then provide dot clock at the proper timing to the appropriate circuit elements in the control circuit 12 which is next to be described.

Figure 4:
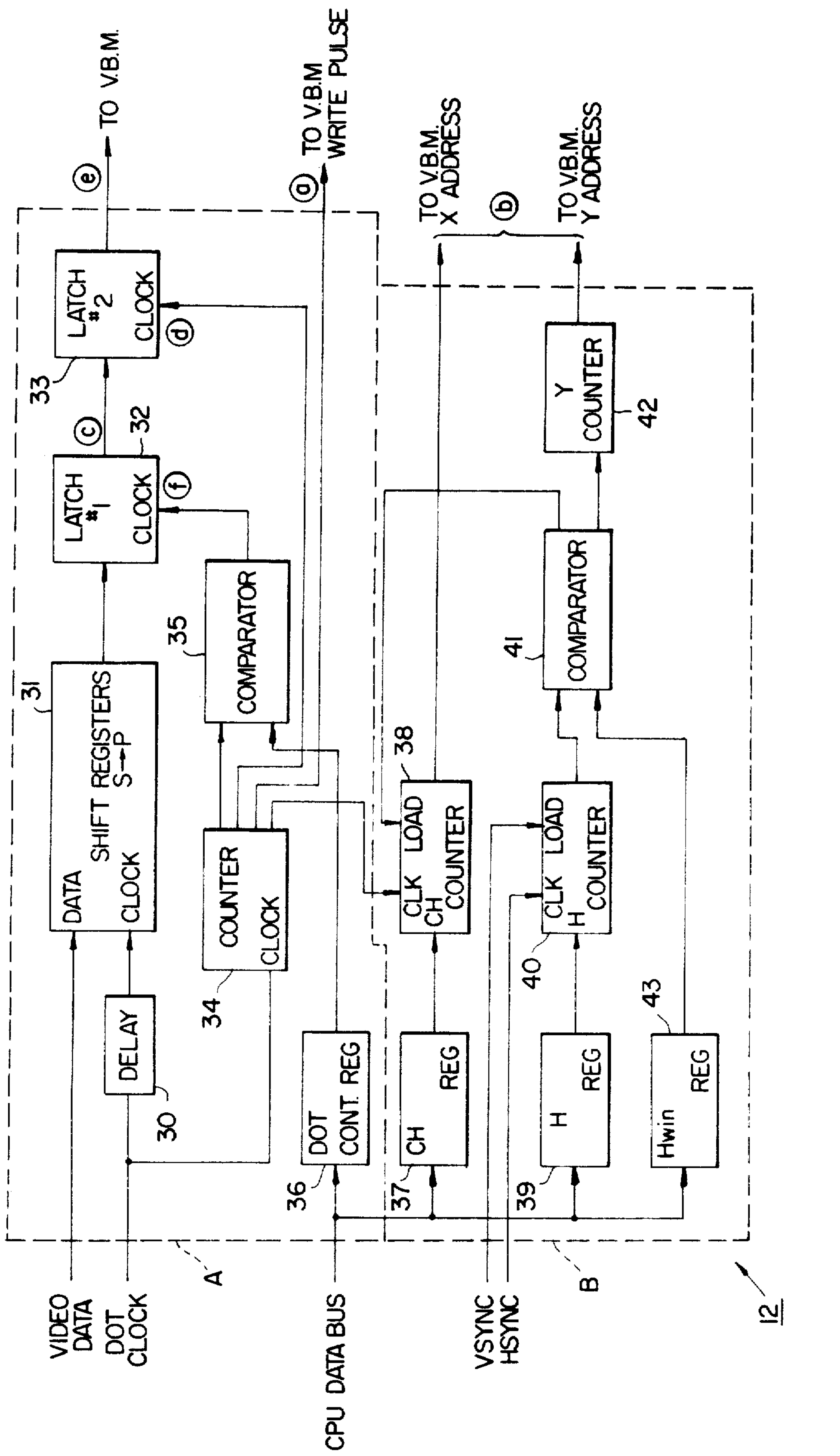
FIG. 4 is a block diagram showing the internal circuit elements arranged within the control circuit.

The arrangement of the control circuit 12 is shown in FIG. 4, and it consists essentially of two blocks A and B. Generally, the control circuit 12 responds to the various signals from the video interface 10, such as VSYNC, HSYNC, video data and dot clock, and the control signals from the CPU 16 within the control section 9 through the control bus (CPU BUS), and generates control signals required to transfer (write) the video data to the video buffer memory 11, such as data, address, and write signals. Specifically, the block A provides the function that allows each video data bit sequence serially provided by the video interface circuit 10 to be converted to the corresponding 8-bit parallel data so that it can properly be written to the video buffer memory 11. The block B generates address signals from the VSYNC, HSYNC, and dot clock signals of the video interface circuit 10. The address signals represent the corresponding addresses of the video buffer memory 11 at which the appropriate video data is to be stored.

As shown in FIG. 4, the block A includes a delay circuit 30 which controls the timing between the video data and dot clock signals at the time of the coversion of the serial video data sequence to the corresponding 8-bit parallel sequence so that the proper video data can be stored into the video buffer memory 11. The serial to parallel conversion is provided by an 8-bit parallel-out, serial shift register 31, which converts a serial-form video data sequence from the video interface 10 into the corresponding 8-bit parallel data, which will be written to the video buffer memory 11. Before being written to the buffer memory 11, the data is passed through latches 32 and 33 which are controlled by the control signals from the counter 34 and comparator 35, respectively, so that the write data can be written to the video buffer memory 11 at the proper write timing. The block A further includes a dot control register 36, whose content is set under control of CPU to a value corresponding to the number of bits contained in one given character. That is, what (nth) bit in the character should first be written to the video buffer memory 11 is determined by the setting of the dot control register 36. For example, if one character is an 8-bit sequence and if the dot cntrol register 36 is set to "7", the write operation to the video buffer memory 11 begins with the 7th bit.

Figure 5:
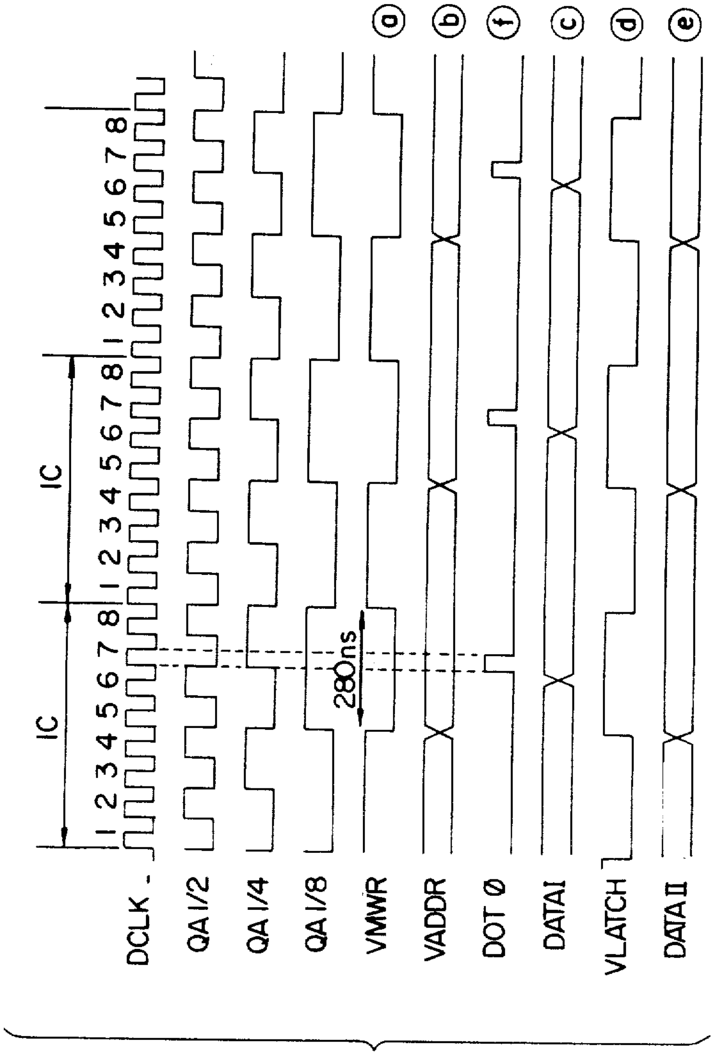
FIG. 5 is a timing chart diagram of the various signals which appear in the associated circuit components within the block A of the control circuit.

FIG. 5 represents the write timing chart diagram for the video buffer memory 11. As seen from the diagram, a write pulse a to be provided by the counter 34 and an address pulse b to be provided by the block B in the control circuit 12 have an output timing synchronized with respect to each other. It is also shown that the rising or falling timing of the video data pulse designated by c is out of phase with respect to those two pulses a and b. In the timing diagram, it is assumed that the dot control register 36 is set to "7", and therefore the output timing of the video data coincides with that of a pulse f which represents the value of "7". The latch 33 mentioned earlier is provided for controlling this timing, and responds to an input clock pulse signal so that it can synchronize the timing of the video data as represented by e with the write pulse a.

The block B generates an address for addressing the video buffer memory 11. In the block B, a character register 37 is provided, which determines the location of a character to be stored in the video buffer memory 11. A character counter provides a horizontal address location, and HSYNC register 39 establishes the number of occurrences of the HSYNC signal to be counted by a next-stage HSYNC counter 40 whose input is connected to the output of HSYNC register 39. The output of the HSYNC counter 40 is connected to one input of a comparator 41, one output of which is connected to input of a Y counter 42 which provides a vertical address location. An H window register 43, whose input is connected to the CPU BUS, provides a control signal which is fed into the other input of the comparator 41 and is used to determine the range of the vertical address output.

In the foregoing description related to the various registers, the dot control register 36 in the block A as well as the character register 37, HSYNC register 39, and H window register in the block B are operated under control of the control section 9 so that each of the registers can hold the appropriate values supplied by the control section.

The fundamental function of the horizontal address circuitry is to determine the horizontal address or location of data to be transferred to the video buffer memory 11. The composite video signal output from the external microcomputer 1 contains information signal components and HSYNC signals. In order to transfer any desired portion of the data contained in the composite video signal to the memory 11, the horizontal address circuitry identifies that data portion from the HSYNC signal. That is, the circuitry determines from the HSYNC signal what portion of the information should first be transferred to the video buffer memory 11. It is assumed, for example, that the composite video signal provides data at the left end of the CRT screen at the timing of the 17th character from the HSYNC signal and that it is desired that beginning with the data at the left end of the screen, the data should be transferred to the video buffer memory 11, this requirement would be satisfied by setting the character register 37 to a value of "16". Similarly, the fundamental function of the vertical address circuitry is to determine the vertical address or location of the data to be transferred to the video buffer memory 11. The HSYNC register 39 and HSYNC counter 40 are provided for this purpose, which indentify that data portion by counting the number of occurrences of HSYNC signal from the VSYNC signal contained in the composite video signal. It is assumed, for example, that after the composite video signal provides 35 occurrences of HSYNC signal following the VSYNC signal, the data appears at the top of the CRT screen and that it is desired that beginning with the top line, the data should be transferred, this requirement would be met by setting the HSYNC register 39 to a value of "35". As described, the H window register 43 contains vertical addresses, and determines the range of the address output. For example, data is to be transferred during a period in which 16 HSYNC signals (that is equal to 16 lines) occur, the H window register 43 would be set to "16". The comparator 14 is a form of AND gate, which during a period determined by the H window register 43 transfers the signals from the H counter 40 to the character counter 38 and counter 42 according to each occurrence of HSYNC signal.

Figure 6:
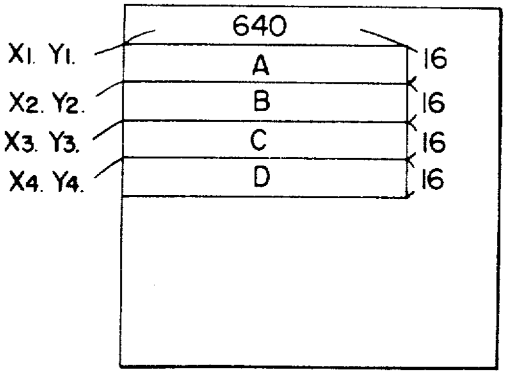
FIG. 6 shows the format of the CRT screen on which the first and succeeding groups of lines of data from the LCD buffer memory, for example, are to be displayed sequentially, each occupying the 640 dots by 16 lines on the screen.

Next, the sequence in which the transfer of the information from the CRT screen generated by the composite video signals of the external microcomputer 1 to the LCD display device 8 takes place is described. In the described embodiment, the LCD display 8 provides a display area of 640 dots by 64 lines. Therefore, the amount of information to be transferred to the LCD display 8 is limited to the range of CRT display area that corresponds to 640×64. FIG. 6 shows the format of the CRT screen, from which in this example, the first 64 lines from the top inclusive are to be transferred.

The video buffer RAM 11 provides 2K bytes of memory, and is only capable of storing 16 lines of the CRT screen. The following sequence of operation takes place for transfer of every 16 lines, and is repeated four times to transfer a total of 64 lines.

Referring to FIG. 6, the steps of transferring the portion of data designated by "A", which is addressed by $(x_1Y_1)$ and is equivalent to 16 lines are described below:

(1) The H window register 43 is set.

In this case, as the video buffer memory provides 2K bytes of memory in which 16 lines of data is to be stored, this register would be set to "16".

(2) The dot control register 36 is set.

In this case, the register would be set to "0" since the characters are transferred from the beginning.

(3) The character register 37 is set.

This register is set to "16" since it is assumed that the 17th character from the HSYNC signal corresponds to the left end of the screen.

(4) The HSYNC register 39 is set.

This register would be set "35" since it is assumed that the next occurrence following the 35th HSYNC signal from VSYNC signal corresponds to the first line on the screen.

(5) After verifying that the CRT screen data has been transferred to the video buffer memory 11, CPU 16 within the control section 9 reads the data from the video buffer memory 11, and transfers it to the LCD buffer RAM 13.

This completes the transfer of the "A" portion, and the same sequence of transfer operation occurs for the succeeding "B", "C" and "D" portions. The transfer of the "B" portion takes place, beginning with the 17th line, and therefore the HSYNC register 39 would be set to "35+17", or "52".

The above sequence has been described for the transfer of the data on the 1:1 scale. For the transfer of the data on the scaling (up or down) proportion, CPU 16 handles the scaling functions at the time of transfer from the video buffer memory 11 to the LCD buffer RAM.

Although it may also be possible to display a great amount of video signal information on the small physical screen 22 by varying the output video signals 2 of the external microcomputer 1, it is necessary to change or add the hardware and software of the external microcomputer to match the requirements of the LCD, etc. display devices 8. The present invention eliminates the need of doing so. According to the present invention, any desired amount of information can be displayed on the physical screen without causing the external microcomputer 1 to vary the video signals 2. For the graphical representation application in particular, many calculations are required to obtain the x, y coordinates of the display if the content being displayed is to be changed or moved by varying the video signals 2. In accordance with the present invention, such change or movement can be achieved by partially extracting any desired portion of graphical information from the virtual display space. This can be done very simply and at a high speed.

The prior art display subsystem will become very costly when the display containing a matrix of m×n dots is to be presented on the physical screen 22. In some cases, with the CRT displays currently available, this display is practically impossible. The display control method provided by the present invention permits even the inexpensive CRT display devices to provide a fine or high-resolution display, since it permits a partial extraction of the information to be displayed.

It has been described hereinabove that the relationship between the physical screen size 22 of the LCD, etc. displays 4, 5 and 8 and the virtual display screen size 21 created by the video signals 2 is established as a scale of 1:1, and that the display includes a full-screen display and a partial screen display. It is also possible to provide a scaled-up display or scaled-down display with respect to the virtual display screen (without affecting the video signals). If the content of the video signal virtual display space is dynamically changing, it is also possible to pick out on retrieve a particular image at a given time and display it as a still picture on the physical screen.

The operation of the control section 9 takes place in accordance with the software programs just like the usual computer system. In addition to its display control functions described above, the control section 9 may provide other functions. For the display of partially extracted information, the information or message which indicates the location where a particular information has been extracted or retrieved can be displayed on another output device or on certain screen areas of the same display device. A tabulation consisting of columns and rows can overlap the information being displayed.

As clearly seen from the foregoing description, the present invention provides several advantages over the prior art technology. One advantage is that the whole or part of the output visual information from the external microcomputer or other control system can be presented on a scale of 1:1, on a scaled-up size, on a scaled-down size, or as partially extracted, on the physical screen of the LCD or other similar displays. This display can be provided without affecting or varying the output video signals of the external microcomputer. Another advantage derived from the above feature is the optimum or selective use of all the functions or performance of the external microcomputer without being restricted by the performance of the display devices.

Although the present invention has fully been described by way of the shown preferred embodiments thereof, it should be understood that various changes and modifications may be made without departing from the spirit and scope of the invention.

What is claimed is:

1. A method of displaying video signal information from the external microcomputer or other control system on LCD or other similar display devices, comprising the steps of:

supplying output video signals from the external microcomputer to input section including video interface means and display control means;

separating said output video signal through said video interface means into signal components including HSYNC, VSYNC, video data and data clock signals which are to be fed into said display control means;

storing count control data from a central processor (CPU) connected to said display control means through CPU control bus;

counting the number of occurrences of HSYNC and VSYNC signals until the number to be determined by said count control data, and then generating and providing the respective horizontal and vertical addresses to a video buffer memory;

counting the number of dot clock signals until the number to be determined by said count control data is reached, and then generating and providing a write pulse to said video buffer memory;

converting serial bit video data to parallel bit video data in accordance with the dot clock signals through a delay circuit means and providing said parallel video data to latch circuit means under control of clock signals;

transferring said video data to the video buffer memory and storing the same at the horizontal and vertical addresses therein in response to the write pulse; and retrieving any desired portion of the video data from said video buffer memory and transferring it to the LCD display device through LCD buffer RAM.

2. A method as defined in claim 1, wherein the video data contained in the virtual display space created by the composite video signals is provided to the physical LCD display screen on a scale-up, scale-down or partial extraction basis.

3. A method as defined in claim 2, wherein the partially extracted information is presented in a fixed mode or a scrollable mode.

4. An apparatus for displaying video signal information from the external microcomputer or other control system on LCD or other similar display devices, comprising:

input section including video interface means, display control means, and video buffer memory, to which composite video signals from the external microcomputer are to be applied, said interface means including a first block consisting of input buffer for storing data clock signals and a second block consisting of series-connected amplifier and comparator combination which provides separate signal components including HSYNC, VSYNC and video data signals in response to input composite video signal, and said display control means connected to the output of said interface means containing a group of registers each holding the respective control data from a later-defined central processor section and a group of counters each controlled by the corresponding register;

central processor section including a central processor (CPU), a read-only memory (ROM), a random access memory (RAM) and keyboard interface all connected through a common CPU bus to the display control means and video buffer memory in said input section, said ROM containing microcoded instructions which enable the central processor to transfer the signal components between the control means and video buffer memory and between the video buffer memory and a later defined display section; and display section connected through said common CPU bus to said input section and to said central processor section, including LCD buffer RAM, LCD interface and display driver.

5. An apparatus as defined in claim 4, wherein said display control means consists essentially of two blocks, one of said two blocks being arranged to handle the video data and dot clock signals to provide displayable video data and write pulse to the video buffer memory, and the other block being arranged to handle the VSYNC and HSYNC signals to provide vertical and horizontal address information, respectively.

6. An apparatus as defined in claim 5, wherein said first-mentioned block includes a delay circuit for receiving the dot clock signal and providing dot clock output, and an 8-bit serial-to-parallel shift register having an input to which the video data signal is applied, said delay circuit controlling the timing between the video data signal and dot clock signal and said shift register providing a parallel bit video data sequence to series-connected latch circuit combination.

7. An apparatus as defined in claim 6, wherein said first block further includes series-connected counter and comparator to which the dot clock signal is applied and which provides clock signals to each of said latches, said counter also supplying write pulse output.

8. An apparatus as defined in claim 5, wherein said second-mentioned block includes a group of parallel-connected registers for holding control data from CPU, one of said registers being connected to a counter which provides a horizontal address information, another being connected to a counter to which VSYNC and HSYNC signals are applied and which is connected to a comparator, and the other being branched to said first-mentioned counter and to a counter which provides a vertical address information, those vertical and horizontal address information being supplied to the video buffer memory.

* * * * *